(12) United States Patent
Pandharipande et al.

(10) Patent No.: US 11,974,376 B2
(45) Date of Patent: Apr. 30, 2024

(54) MONITORING SYSTEM FOR MONITORING ELECTRICAL DEVICES (71) Applicant: SIGNIFY HOLDING B.V., Eindhoven (NL)

(72) Inventors: Ashish Vijay Pandharipande, Eindhoven (NL); Jurgen Mario Vangeel, Beerse (BE); David Ricardo Caicedo Fernandez, Eindhoven (NL); Bas Marinus Johannus Van Berkel, Veghel (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/090,938

(22) PCT Filed: Mar. 30, 2017

(86) PCT No.: PCT/EP2017/057566
§ 371 (c)(1),
(2) Date: Oct. 3, 2018

(87) PCT Pub. No.: WO2017/174435
PCT Pub. Date: Oct. 12, 2017

(65) Prior Publication Data
US 2019/0124744 A1   Apr. 25, 2019

(30) Foreign Application Priority Data

Apr. 6, 2016 (EP) .................................... 16164050

(51) Int. Cl.
*H05B 47/115* (2020.01)
*H05B 45/10* (2020.01)
(Continued)

(52) U.S. Cl.
CPC ........... *H05B 47/115* (2020.01); *H05B 45/10* (2020.01); *H05B 45/50* (2020.01); *H05B 47/175* (2020.01)

(58) Field of Classification Search
CPC ............ H05B 37/0272; H05B 37/0245; H05B 37/0254; H05B 33/0854; H05B 33/0818;
(Continued)

(56) References Cited

U.S. PATENT DOCUMENTS 7,961,075 B2 * 6/2011 Kuenzler ............... H05B 47/19
340/3.52
9,049,038 B2    6/2015 Cavalcanti
(Continued)

FOREIGN PATENT DOCUMENTS

WO    2011110969 A1   9/2011
WO    2012025868 A2   3/2012

*Primary Examiner* — Wei (Victor) Y Chan (57) ABSTRACT

The invention relates to a monitoring system (13) for monitoring electrical devices (A, B, C, D, K) like luminaires. An assignments providing unit (7) provides assignments between the electrical devices and behavior classes defining expected behaviors, wherein a deviation determination unit (9) determines a deviation a) between a monitored behavior of an electrical device assigned to a behavior class and an expected behavior defined by a behavior class and/or b) between a monitored behavior of an electrical device and a monitored behavior of another electrical device, wherein an output unit (10) provides an output depending on the determined deviation. The deviation can be indicative of a commissioning error, i.e., for instance, of an assignment of an electrical device to a wrong room within a building. The monitoring system can therefore allow for an automatic detection of commissioning errors in a building which may have thousands of electrical devices.

16 Claims, 7 Drawing Sheets

(51) Int. Cl.
*H05B 45/50* (2020.01)
*H05B 47/175* (2020.01)

(58) Field of Classification Search
CPC .............. H05B 33/089; H05B 37/0218; H05B 33/0803
USPC ........ 315/291, 294, 362, 129, 132, 134, 151
See application file for complete search history.

(56) References Cited

U.S. PATENT DOCUMENTS

| | | |
|---|---|---|
| 2008/0048095 A1 | 2/2008 | Matheson |
| 2011/0018465 A1 | 1/2011 | Ashdown |
| 2012/0013257 A1* | 1/2012 | Sibert .................. H05B 47/175 315/152 |
| 2014/0055040 A1* | 2/2014 | Nishigaki .............. H05B 47/10 315/152 |
| 2014/0070707 A1* | 3/2014 | Nagazoe .............. H05B 47/165 315/151 |
| 2014/0222213 A1* | 8/2014 | Mohan ................. H05B 47/175 700/275 |
| 2014/0285096 A1* | 9/2014 | Cuppen ................ H05B 47/155 315/153 |
| 2014/0300276 A1* | 10/2014 | Wang ...................... H04W 4/33 315/151 |
| 2014/0354161 A1* | 12/2014 | Aggarwal ............ H05B 47/105 315/153 |
| 2016/0091217 A1 | 3/2016 | Verberkt et al. |
| 2017/0156195 A1* | 6/2017 | Shepherd ............... H05B 47/18 |

* cited by examiner

MONITORING SYSTEM FOR MONITORING ELECTRICAL DEVICES

CROSS-REFERENCE TO PRIOR APPLICATIONS

This application is the U.S. National Phase application under 35 U.S.C. § 371 of International Application No. PCT/EP2017/057566, filed on Mar. 30, 2017, which claims the benefit of European Patent Application No. 16164050.3, filed on Apr. 6, 2016. These applications are hereby incorporated by reference herein.

FIELD OF THE INVENTION

The invention relates to a monitoring system, method and computer program for monitoring electrical devices like luminaires in a building. The invention further relates to an electrical device to be monitored, and to a system comprising electrical devices and the monitoring system.

BACKGROUND OF THE INVENTION

In a building many luminaires are often present, wherein each luminaire is equipped with a presence sensor being adapted to provide a sensing signal being indicative of a presence of a subject in the environment of the respective luminaire and a light source, wherein the light source is controlled depending on the sensing signal. In particular, the light source is controlled to be switched on, if the sensing signal indicates a presence of a subject in the environment of the luminaire, and to be switched off, if the sensor has not provided a sensing signal indicating a presence of a subject in the environment of the luminaire for a predetermined time. A light source of a luminaire can also be controlled depending on a sensing signal provided by a sensor not being a sensor of the luminaire. For instance, if a luminaire is located in a room of the building, the light source of the luminaire may be controlled such that it is switched on, if any sensor within the same room generates a sensing signal indicating a presence of a subject within this room.

During a commissioning procedure it is determined which luminaire is located in which room of the building and this commissioning information can be stored, for instance, in a building management system.

From US 2016/091217 A1 a lighting system is known in which luminaires and other devices can be assigned to groups. These devices can be configured according to a template which determines the behavior of these devices; i.e. how these devices are controlled.

A building may comprise thousands of luminaires with light sources and sensors, wherein it is very time consuming to determine whether the commissioning information is correct for each luminaire, i.e. it is very difficult to identify commissioning errors.

SUMMARY OF THE INVENTION

It is an object of the present invention to provide a monitoring system, method and computer program for monitoring electrical devices, which allow for an easier identification of commissioning errors. It is a further object of the present invention to provide an electrical device to be monitored, and a system comprising electrical devices and the monitoring system.

In a first aspect of the present invention a monitoring system for monitoring electrical devices is presented, wherein the monitoring system comprises:

an assignments providing unit for providing assignments between the electrical devices and behavior classes, wherein a behavior class defines an expected behavior of a respective electrical device assigned to the behavior class over time, a monitoring unit for monitoring the behavior of the electrical devices over time, a deviation determination unit for determining a deviation a) between a monitored behavior of an electrical device assigned to a behavior class and an expected behavior defined by a behavior class and/or b) between a monitored behavior of an electrical device and a monitored behavior of another electrical device, and an output unit for providing an output depending on the determined deviation.

A deviation between a monitored behavior of an electrical device and an expected behavior defined by a behavior class can indicate an error in assigning the electrical device to the behavior class. For instance, if the deviation between the monitored behavior of the electrical device and an expected behavior defined by the behavior class of the electrical device is relatively large, i.e., for instance, larger than a predefined deviation threshold, this can indicate that the electrical device has been assigned to the wrong behavior class and this can be output by the output unit. As a further example, the deviation determination unit can be adapted to determine a deviation of a monitored behavior of an electrical device assigned to a behavior class from an expected behavior defined by another behavior class, wherein, if this deviation is relatively small, i.e., for instance, smaller than a predefined deviation threshold, this may indicate that the electrical device has been assigned to the wrong behavior class, wherein this information may be output by the output providing unit. Also a deviation between a monitored behavior of an electrical device and a monitored behavior of another electrical device can indicate an error in assigning the electrical device to the behavior class. For instance, a deviation between the monitored behavior of the electrical device assigned to a behavior class and a monitored behavior of another electrical device of the same behavior class may be determined, wherein, if this deviation is relatively large, i.e., for instance, larger than a predefined deviation threshold, this may indicate that at least one of these electrical devices has been assigned to a wrong behavior class, wherein this information can be output by the output unit. As a further example, the deviation determination unit can be adapted to determine a deviation between a monitored behavior of an electrical device assigned to a behavior class and a monitored behavior of another electrical device assigned to another behavior class, wherein, if this deviation is relatively small, i.e., for instance, if this deviation is smaller than a predefined deviation threshold, this may indicate that at least one of these electrical devices has been assigned to a wrong behavior class, wherein this information may be output by using the output unit. Thus, based on the deviations wrong assignments of electrical devices to behavior classes and hence commissioning errors can be identified and output.

The deviation determination unit can be adapted to apply a similarity measure to the behaviors, especially to signals describing the behaviors, which should be compared. The similarity measure is, for instance, a correlation function to be applied to signals describing the behavior to be compared. For example, if an electrical device is a sensor generating a sensing signal depending on, for instance, a presence of a subject in the environment of the sensor, this sensing signal may be used for describing the behavior of the sensor. If an electrical device is a light source, a signal being indicative of the light intensity provided by the light source like a driving signal for driving the light source may be used for describing the behavior of the light source.

In an embodiment the electrical devices may include a first electrical device controlling a second electrical device, wherein the deviation determination unit may be adapted to determine a deviation between the monitored behavior of the first electrical device and the monitored behavior of the second electrical device, wherein, if this deviation is relatively large, i.e., for instance, if the deviation is larger than a predefined deviation threshold, at least one of these electrical devices may have been assigned to the wrong behavior class, wherein this information may be output by the output unit. Generally, if a first electrical device controls a second electrical device it is very likely that they should be assigned to the same behavior class. For instance, if the first electrical device is a sensor and the second electrical device is a light source to be controlled by the sensor, it is very likely that the sensor and the light source are installed in a same room or a same corridor of a building. Thus, if the behavior classes assigned to the light source and the sensor are different, it is very likely that at least one of these assignments is not correct, wherein this information can be provided by the output unit.

In an embodiment the deviation determination unit is adapted to determine deviations of a monitored behavior of an electrical device from all expected behaviors defined by all behavior classes, wherein the output unit is adapted to indicate if all deviations are larger than a predefined deviation threshold. If a monitored behavior of electrical device does not fit to any expected behavior defined by the behavior classes, i.e. if with respect to all behavior classes the deviation of the monitored behavior is relatively large, this may indicate that the electrical device does not behave properly, i.e., for instance, that the electrical device has a malfunction, wherein this information can be indicated by the output unit.

The assignments providing unit can be adapted to provide a user interface allowing a user to assign an electrical device to a behavior class. Thus, a user like an installer can assign an electrical device to a behavior class, wherein, if this manually provided assignment is not correct, this incorrect assignment may be identified based on the determined deviations. However, the assignments providing unit may also be adapted to determine the assignments automatically. For instance, the assignments providing unit can be adapted to generate an assignment between an electrical device and a behavior class based on a) the monitored behavior of the electrical device and b) the expected behaviors defined by the behavior classes and/or the monitored behavior of an electrical device assigned to a behavior class. In particular, the assignments providing unit can be adapted to apply a similarity measure to a) the monitored behavior of the electrical device and b) the expected behaviors defined by the behavior classes and to assign the electrical device to a behavior class based on the result of applying the similarity measure. In an embodiment the electrical device can be assigned to the behavior class defining the expected behavior which is most similar to the monitored behavior. Moreover, the assignments providing unit can be adapted to apply a similarity measure to a) the monitored behavior of the electrical device and b) the monitored behaviors of electrical devices assigned to the different behavior classes and to assign the electrical device to a behavior class based on the result of applying the similarity measure. In an embodiment the electrical device can be assigned to the behavior class to which the monitored electrical device has been assigned, of which the monitored behavior is most similar to the monitored behavior of the electrical device which should be assigned to a behavior class.

Preferentially the assignments providing unit is adapted to provide the assignments such that electrical devices located in a same room or corridor are assigned to a same behavior class. Thus, in an embodiment electrical devices in a same room or corridor are expected to behave in a same way. The behavior classes, which may also be regarded as defining roles of the electrical devices, can refer to, for instance, "meeting room" defining a behavior of electrical devices likes light sources and/or sensors in a meeting room or "open work space" defining a behavior of these electrical devices in an open work space.

In an embodiment the monitoring system is a distributed monitoring system, wherein the assignment providing unit comprises assignment providing subunits, the monitoring unit comprises monitoring subunits, the deviation determination unit comprises deviation determination subunits and the output unit comprises output subunits, wherein the assignment providing subunits, the monitoring subunits, the deviation determination subunits and the output subunits are integrated in the electrical devices. Thus, in an embodiment it may not be necessary to provide an additional monitoring system, i.e. a further device in addition to the electrical devices, for providing the monitoring functionality, because the functions of providing the assignments, monitoring the behaviors, determining the deviations and providing the outputs can be integrated in the electrical devices.

In a further aspect of the present invention a system of electrical devices is presented, wherein the system comprises the electrical devices and a monitoring system as defined by claim 1.

It is preferred that the electrical devices include light sources and sensors, wherein the light sources and the sensors are adapted to control the light sources depending on sensing signals generated by the sensors. The sensors and light sources may be integrated in luminaires. However, the sensors and the light sources may also be physically separated units.

Preferentially the sensors include one or several sensors being adapted to provide a sensing signal being indicative of a property of the environment of the respective sensor. In particular, the one or several sensors are presence sensors, which may also be named occupancy sensors, providing a sensing signal being indicative of a presence of a subject in the environment of the respective sensor.

In a further aspect of the present invention an electrical device to be used in the distributed monitoring system as defined in claim 10 is presented, wherein the electrical device comprises an assignment providing subunit, a monitoring subunit, a deviation determination subunit and an output subunit of the subunits defined in claim 10. In particular, the assignment providing subunit is adapted to provide an assignment between the electrical device and a behavior class, wherein the behavior class defines an expected behavior of the electrical device over time, the monitoring subunit is adapted to monitor the behavior of the electrical device over time, the deviation determination subunit is adapted to determine a deviation a) between the monitored behavior of the electrical device and the expected behavior defined by the behavior class and/or b) between the monitored behavior of the electrical device and a monitored behavior of another electrical device, and the output subunit is adapted to provide an output depending on the determined deviation. Thus, in an embodiment a respective electrical device itself may be able to determine a respective deviation and to provide an output depending on the determined deviation, in order to indicate, for instance, a commissioning error of the electrical device.

In a further aspect of the present invention a monitoring method for monitoring electrical devices is presented, wherein the monitoring method comprises:

providing assignments between the electrical devices and behavior classes by an assignments providing unit, wherein a behavior class defines an expected behavior of a respective electrical device assigned to the behavior class over time, monitoring the behavior of the electrical devices over time by a monitoring unit, determining a deviation a) between a monitored behavior of an electrical device and an expected behavior defined by a behavior class and/or b) between a monitored behavior of an electrical device and a monitored behavior of another electrical device by a deviation determination unit, and providing an output depending on the determined deviation by an output unit.

In another aspect of the present invention a computer program for monitoring electrical devices is presented, wherein the computer program comprises program code means for causing the monitoring system as defined by claim 1 to carry out the monitoring method as defined by claim 14, when the computer program is run on the monitoring system. It shall be understood that the monitoring system of claim 1, the system of electrical devices of claim 10, the monitoring method of claim 14 and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
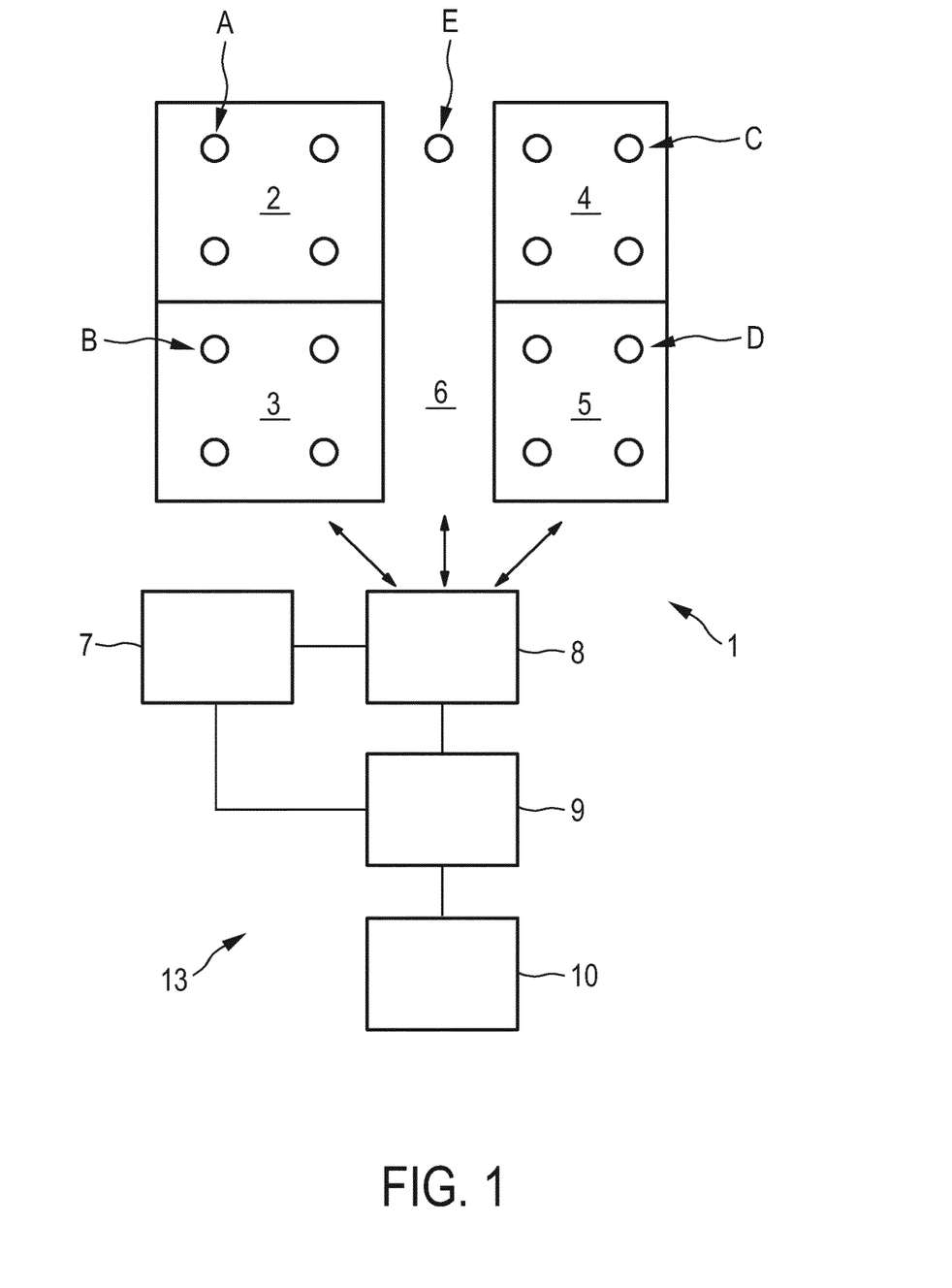
FIG. 1 shows schematically and exemplarily an embodiment of a system of electrical devices comprising a monitoring system.

FIG. 1 shows schematically and exemplarily an embodiment of a system 1 comprising electrical devices A, B, C, D, E and a monitoring system 13. In this embodiment the electrical devices A, B, C, D, E are luminaires assigned to different behavior classes which correspond to different rooms 2, 3, 4, 5 and a corridor 6. In particular, first luminaires A are located within a first room 2 and should be assigned to a first behavior class, second luminaires B are located in a second room 3 and should be assigned to a third behavior class, third luminaires C are located in a third room 4 and should be assigned to a third class, fourth luminaires D are located in a fourth room 5 and should be assigned to a fourth behavior class and luminaires E are located in the corridor 6 and should be assigned to a fifth behavior class. The behavior classes define expected behaviors of the luminaires A, B, C, D, E and these expected behaviors are stored together with the assignments in an assignments providing unit 7 of the monitoring system 13.

Figure 2:
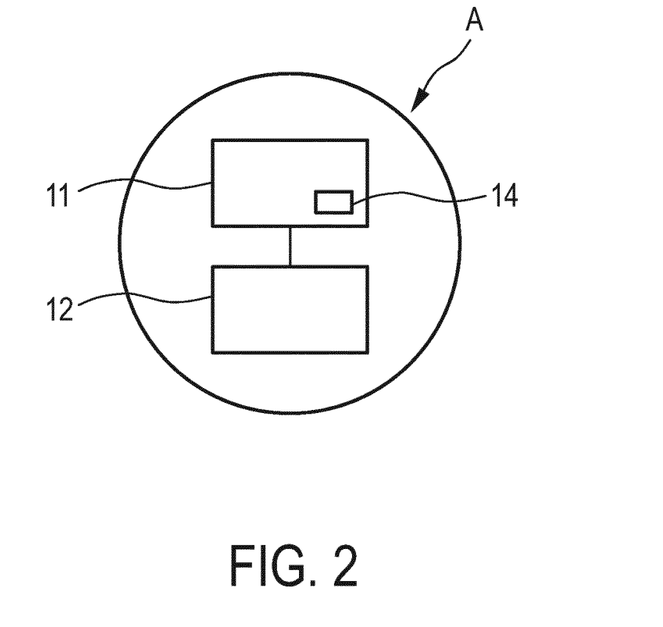
FIG. 2 shows schematically and exemplarily an electrical device of the system shown in FIG. 1.

In this embodiment each luminaire A, B, C, D, E comprises a light source 11 and a sensor 12 as schematically and exemplarily illustrated in FIG. 2. The sensor 12 is a presence sensor for providing a sensing signal being indicative of a presence of a person in the environment of the sensor 12. The light source 11 comprises a control unit 14 for controlling the light source 11, especially for controlling whether the light source 11 should provide light or should not provide light and optionally also for controlling the light intensity, i.e. a dimming level. The control unit 14 can be adapted to control the light source 11 depending on the sensing signal provided by the sensor 12. In particular, the control unit 14 is adapted to control the light source 11 such that the light source is switched on, if the sensing signal indicates that a person is in the environment of the luminaire, and to switch the light source 11 off, if a sensing signal indicating a presence of a person in the environment has not been provided for a predetermined time.

The monitoring system 13 further comprises a monitoring unit 8 for monitoring the behavior of the luminaires A, B, C, D, E over time. In this embodiment the behavior of the luminaires A, B, C, D, E is defined by the sensing signals provided by the sensors 12 integrated in the luminaires A, B, C, D, E, because, if the respective sensor 12 detects a person in the environment of the respective luminaire and if this is indicated by providing a corresponding sensing signal, the respective light source is switched on and since, if the respective sensor does not detect a presence of a person in the environment of the respective luminaire for a predetermined time, a sensing signal indicating such a presence is not provided and the respective light source is switched off. The monitoring unit 8 is connected with all luminaires A, B, C, D, E via a signal connection, in order to allow the monitoring unit 8 to monitor the sensing signals provided by the sensors 12 of the luminaires A, B, C, D, E and to store these sensing signals. The signal connection can be, for instance, an Ethernet connection or another kind of signal connection which might be completely or partly wired or wireless.

The monitoring system further comprises a deviation determination unit 9 for determining a deviation a) between a monitored behavior of a luminaire assigned to a behavior class and an expected behavior defined by a behavior class and/or b) between a monitored behavior of a luminaire and a monitored behavior of another luminaire, wherein an output unit 10 provides an output depending the determined deviation.

For instance, the deviation determination unit 9 can be adapted to determine a deviation of a monitored behavior of a luminaire from an expected behavior defined by the behavior class assigned to the luminaire. In particular, for each luminaire A, B, C, D, E such a deviation may be determined, wherein, if for a certain luminaire the deviation is larger than a predefined deviation threshold, an identification of this luminaire and this deviation may be output by the output unit 10, in order to indicate that this luminaire may have been assigned to a wrong behavior class. For instance, if a luminaire located in the first room 2 has wrongly been assigned to the fifth behavior class which corresponds to the corridor 6, the monitored behavior of this luminaire will not be in conformance with the expected behavior as defined by the first behavior class. This non conformance can be detected and used for identifying the wrongly assigned luminaire.

Moreover, the deviation determination unit 9 can be adapted to determine a deviation of a monitored behavior of a luminaire assigned to a behavior class from an expected behavior defined by another behavior class. If the monitored behavior of a luminaire assigned a certain behavior class is in conformance with an expected behavior defined by another behavior class, the luminaire may have been assigned to a wrong class and it should be assigned to the other behavior class, wherein this can be indicated by using the output unit 10. Thus, in an embodiment for each luminaire assigned to a behavior class the monitored behavior may be compared with expected behaviors defined by other behavior classes, wherein, if for a combination of the monitored behavior of the respective luminaire and the expected behavior defined by the respective behavior class the deviation is smaller than a predefined threshold, it can be output that the luminaire may have been assigned to the wrong behavior class and should be assigned to the behavior class for which the relatively small deviation has been determined.

Furthermore, the deviation determination unit 9 can be adapted to determine a deviation of a monitored behavior of a luminaire assigned to a behavior class from a monitored behavior of another luminaire assigned to the same behavior class. If this deviation is relatively large, i.e., for instance, if it is larger than a predefined deviation threshold, at least one of these luminaires has likely been assigned to a wrong behavior class and this can be indicated by using the output unit 10. Thus, in an embodiment for each luminaire assigned to a behavior class a deviation between the monitored behavior of this luminaire and one or several monitored behaviors of other luminaires of the same behavior class can be determined and these deviations can be used for identifying luminaires which have possibly been assigned to a wrong behavior class, i.e. which should have been assigned to another behavior class.

The deviation determination unit 9 can also be adapted to determine a deviation of a monitored behavior of a luminaire assigned to a behavior class from a monitored behavior of another luminaire assigned to another behavior class, wherein, if this deviation is relatively small, i.e., for instance, smaller than a predefined deviation threshold, this may indicate that at least one of these luminaires has been assigned to a wrong behavior class, because due to the similarity of the monitored behaviors it is very likely that they should have been assigned to a same behavior class. Thus, in an embodiment the deviation determination unit 9 may be adapted to determine for each luminaire assigned to a certain behavior class deviations of the monitored behavior of the respective luminaire from monitored behaviors of luminaires assigned to other behavior classes, wherein, if for a certain combination of luminaires assigned to different behavior classes the deviation is relatively small, this may be indicated by using the output unit 10.

The deviation determination unit 9 can also be adapted to determine deviations of a monitored behavior of a luminaire from all expected behaviors defined by all behavior classes. If these deviations are all relatively large, i.e., for instance, larger than a predefined deviation threshold, the behavior of the respective luminaire does not correspond to any expected behavior, wherein this may indicate a malfunction of the luminaire. Thus, in an embodiment for each luminaire the respective monitored behavior may be compared with all expected behaviors defined by all behavior classes, in order to determine whether the respective luminaire has a malfunction. If the respective luminaire has a malfunction, this can be indicated by using the output unit 10.

The assignments providing unit 7 can be adapted to provide a user interface allowing a user to assign a luminaire to a behavior class. However, the assignments providing unit 7 can also be adapted to automatically generate assignments between luminaires and behavior classes. For instance, if a luminaire should be assigned to a behavior class, the behavior of the luminaire can be monitored and the monitored behavior of the luminaire can be compared with the expected behaviors defined by the behavior classes, wherein the luminaire can be assigned to the behavior class defining an expected behavior being most similar to the monitored behavior. In particular, the deviation determination unit 9 can determine for each combination of the monitored behavior with the respective expected behavior defined by the respective behavior class a deviation, wherein the luminaire can be assigned to the behavior class for which the smallest deviation has been determined.

For the determination of a deviation a similarity measure can be used like a correlation function applied to a sensing signal defining the monitored behavior and corresponding signals defining the expected behaviors in accordance with the behavior classes.

An assignment of a luminaire to a behavior class can also be based on a comparison of the monitored behavior of the luminaire with monitored behaviors of other luminaires for which the behavior class is known already. If a deviation between the monitored behavior of the luminaire to be assigned to a behavior class and the monitored behavior of one or several other luminaires for which the behavior class is known already is relatively small, i.e., for instance, smaller than a predefined deviation threshold, the luminaire may be assigned to the behavior class of the one or several other luminaires.

As a further example, monitoring behavior of the electrical devices can be performed by determining the mean energy consumption of a luminaire over a period, such as a (business) day, and the mean occupied time over that same period of an occupancy sensor which controls the operation of said luminaire. The correlation between energy consumption and occupancy can then be determined. A low correlation can indicate that either the luminaire has been 'ON' while the occupancy sensor did not trigger or that the luminaire remained 'OFF' even though the occupancy sensor has triggered. If the mean energy usage of the luminaire is close to the maximum usage (for the monitored period), this would indicate the former whereas the mean energy usage of the luminaire being close to zero would indicate the latter. Another manner of distinguishing between the luminaire having been 'ON' vs. 'OFF' too often is to determine the mean energy consumption of the luminaire and the mean occupied time of the occupancy sensor for peak times and non-peak times (e.g. business day vs. non-business day or business hours vs. non-business hours). It would be expected that the sensor would trigger and the lights would be 'ON' more so during peak times than during non-peak times.

Continuing this example, instead of using the mean energy consumption of the luminaire the mean 'ON' time can be used, and instead of using the mean occupied time of the occupancy sensor, the number of occupancy triggers may be used. There are other similar aspects of the operation of a luminaire, occupancy sensor as well as other electrical devices that can be used in applying such monitoring. Further, using known multiclass classification methods, the monitored behavior can be automatically classified to determine e.g. whether a luminiaire and associated occupancy sensor are exhibiting expected behavior and else what (type of) fault is detected.

The output unit can be adapted to provide the output on a display and/or to provide an acoustical output. For instance, the output unit can provide a map showing the locations of all electrical devices of the system and to indicate on the map the electrical devices which may have been wrongly assigned to a behavior class or which may have a malfunction. The respective electrical devices can also be indicated in another way. For instance, each electrical device can comprise an indication lamp like a light emitting diode (LED), wherein, if the monitoring system has identified a certain electrical device, which, for instance, may have been wrongly assigned to a behavior class, the monitoring system may inform the respective electrical device accordingly via the signal connection, whereupon the respective electrical device may indicate the possible assignment failure by using its indication lamp.

Figure 3:
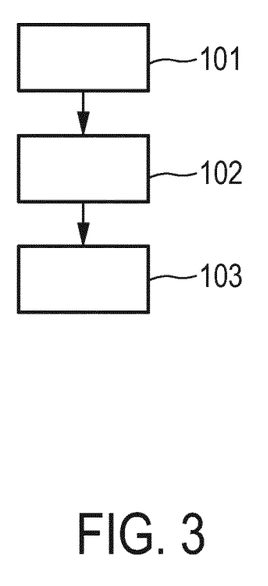
FIG. 3 shows a flowchart exemplarily illustrating an embodiment of a monitoring system for monitoring the electrical devices.

In the following an embodiment of a monitoring method for monitoring electrical devices will exemplarily be described with a reference to a flowchart shown in FIG. 3.

In step 101 the behavior of the luminaires is monitored over time by the monitoring unit 8. In step 102 assignments between the luminaires and behavior classes are provided by the assignments providing unit and a deviation a) between a monitored behavior of a luminaire and an expected behavior defined by a behavior class and/or b) between a monitored behavior of a luminaire and an monitored behavior of another luminaire is determined by the deviation determination unit 9. In step 103 an output is provided depending on the determined deviation by the output unit 10.

Although in above described embodiments sensors and light sources are integrated in luminaires, in other embodiments light sources and sensors can also be physically separated units. For instance, as schematically and exemplarily illustrated in FIG. 4, in an embodiment a system 201 of electrical devices can comprise light sources F, G, H and sensors S1, S2, S3 located in two rooms 20, 21 and a corridor 22. Also in this embodiment the system comprises a monitoring system 213 for monitoring the electrical devices F, G, H, S1, S2, S3. The electrical devices F, G, H, S1, S2, S3 are assigned to behavior classes, wherein, if the assignments to the behavior classes are correct, first light sources F and a first sensor S1, which are located in a first room 20, are assigned to a first behavior class, second light sources G and a second sensor S2, which are located in a second room 21, are assigned to a second behavior class and third light sources H and a third sensor S3, which are located in a corridor 22, are assigned to a third behavior class.

Figure 4:
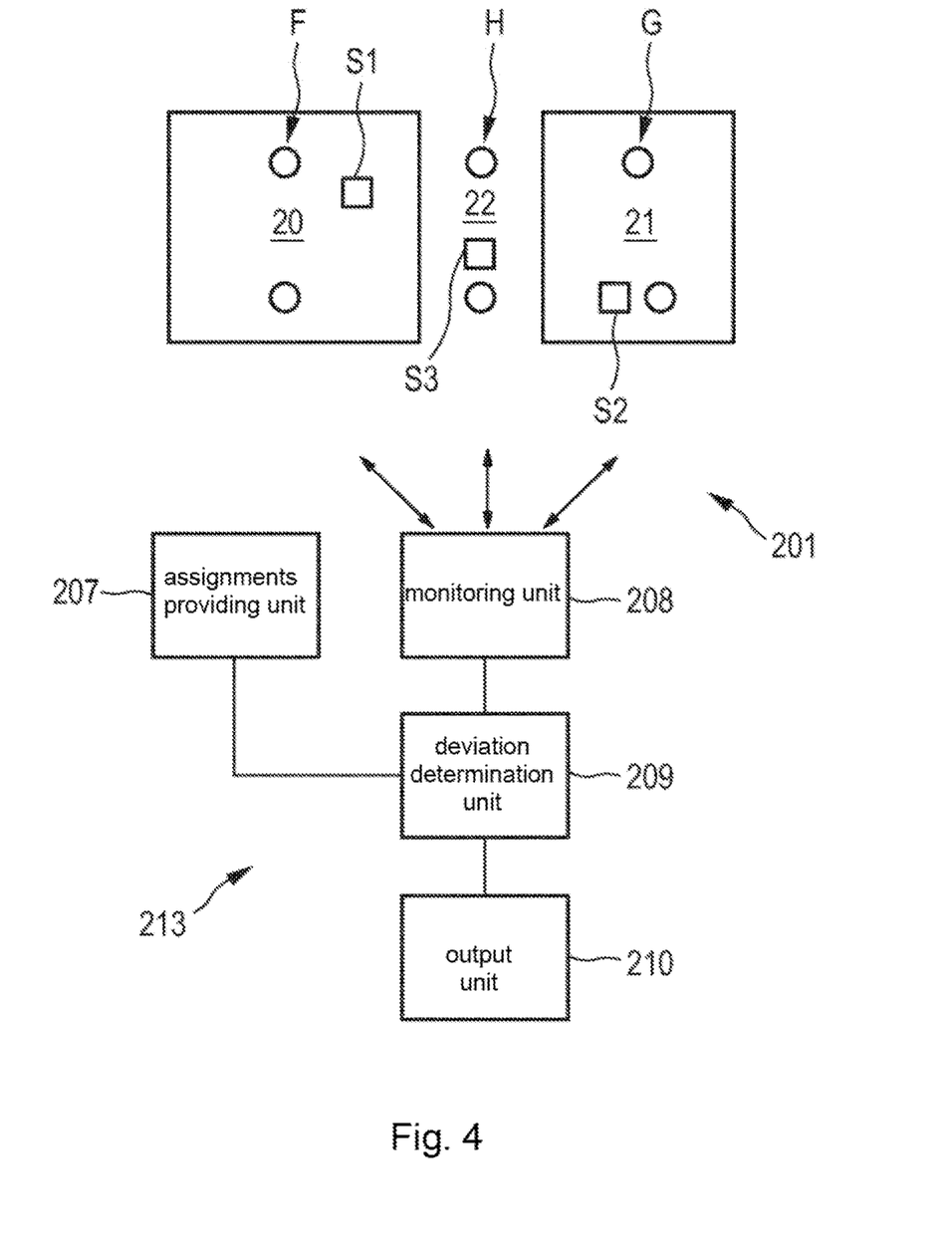
FIG. 4 shows schematically and exemplarily a further embodiment of a system of electrical devices comprising a monitoring system.

The sensors S1, S2, S3 are presence sensors which are adapted to provide a sensing signal being indicative of a presence of a person in the environment of the respective sensor. The sensing signals of the sensors S1, S2, S3 can be regarded as defining the behavior of the sensors S1, S2, S3. The light sources, which are located in a same room, are controlled depending on the sensing signal provided by the sensor also located in this room. Thus, for instance, the light sources F comprise a control unit for controlling the light sources F depending on a sensing signal received from the sensor S1. In particular, if a sensing signal is provided, which indicates that a person is present in the respective room or corridor, respectively, the light sources in this room or corridor, respectively, are switched on. If a sensor located in a room or corridor, respectively, does not provide such a sensing signal, the light sources located in the same room or corridor, respectively, are not switched on. A signal, which is indicative of whether the respective light source is switched on or off like a control signal for controlling the respective light source, can be used as a light source signal defining the behavior of the respective light source.

The behaviors of the light sources F, G, H and of the sensors S1, S2, S3, i.e. the respective signals, are monitored by a monitoring unit 208. An assignments providing unit 207 provides the assignments between a) the light sources F, G, H and the sensors S1, S2, S3 and b) the behavior classes, wherein a deviation determination unit 209 is adapted to determine a deviation a) between a monitored behavior of an electrical device F, G, H, S1, S2, S3 assigned to a behavior class and an expected behavior defined by a behavior class and/or b) between a monitored behavior of an electrical device F, G, H, S1, S2, S3 and a monitored behavior of another electrical device F, G, H, S1, S2, S3. An output unit 210 can then provide an output depending on the determined deviation. The determinations of the deviations and the provision of an output depending on the determined deviations can be similar to the deviations and the outputs described above with reference to FIGS. 1 and 2. Moreover, the output unit 210 can be adapted to provide an output depending on whether a light source and a sensor providing a sensing signal used for controlling the light source are assigned to a same behavior class or to different behavior classes. If this light source and this sensor are assigned to different behavior classes, at least one of these electrical devices has been very likely wrongly assigned to a behavior class, because the light source and the sensor are located in a same room or corridor and should therefore have been assigned to the same behavior class.

The monitoring systems described above with reference to FIGS. 1 to 4 can link electrical devices like luminaires with integrated sensors and light sources or like separate sensors and light sources to roles, i.e. to behavior classes, as part of a commissioning process which might be performed automatically or manually. For example a presence sensor and light sources in a meeting room can be set to the role "meeting room" and a presence sensor and light sources in an open workspace can be set to the role "open work space". Moreover, presence sensors and light sources in a corridor may be set to the role "corridor". Unexpected behavior of an electrical device can be determined by comparing the behavior of the electrical device with a modeled behavior, i.e. with the behavior defined by the respective behavior class and/or with behavior of electrical devices having a same role, i.e. having been assigned to a same behavior class. For instance, a meeting room will almost constantly be occupied during office hours and meetings will typically start at :00 or at :30, i.e. at these times additional movements may be detected.

Thus, the behavior class "meeting room" can define a behavior of a presence sensor such that a sensing signal is indicative of occupancy of the respective room for more than a given percentage of the office hours and that, if the sensing signals are indicative of additional movements, these indications are given at :00 or :30. A behavior defined by the behavior class "corridor" can be such that a sensing signal provided by a presence sensor indicates heavy traffic as people arrive and leave as well as around the lunch rush. Thus, the expected behavior is that a presence sensor provides a sensing signal with relatively large sensing values around the start and the end of the office hours and around the lunch time.

For comparing a monitored behavior of an electrical device and an expected behavior as defined by the respective behavior class a similarity measure like a correlation function can be used. However, also other means can be used for performing this comparison, i.e. for determining a corresponding possible deviation of the monitored behavior from the expected behavior. For instance, if a presence of persons is expected at certain times, these times can be stored in the assignments providing unit for defining the expected behavior of the respective behavior class. It can then be determined whether a monitored behavior of a presence sensor also indicates a presence of persons at the times defined by the respective behavior class. The deviation, i.e. the degree of deviation, can be determined depending on how often a monitored presence detection time, i.e. a time at which a presence of a person is detected, matches a time defined by the respective behavior class in a given time period which might be one, two or three days. If the number of matches is larger, the deviation is smaller. In this case the deviation determination unit may be adapted to provide a deviation value being the percentage of matched times in relation to all times defined by the respective behavior class. The deviation determination unit can of course also be adapted to determine the deviation in another way.

Using the behavior classes various errors can be detected such as a sensor being placed in a corridor, but controlling a light source having the role "meeting room", a sensor having the role "open work space", but which, based on actual data, seems to be placed in, for instance, a maintenance closet, a sensor malfunctioning as the triggers generated do not match any role, et cetera.

If in an embodiment all presence sensors of a room should be assigned to the same behavior class, the behavior class can define the expected behavior such that, if in a neighboring room or a neighboring corridor connected to this room via a door a movement towards the door is detected, within a given time period following the detection of the movement towards the door a presence of a person in this room should be detected. If this is not the case, i.e. if the monitored behavior of a presence sensor assigned to the behavior class of this room deviates from this expected behavior, this presence sensor may have been assigned to the wrong behavior class, i.e. it may not be located in this room although having been assigned to the behavior class of this room. This finding can be shown by the output unit. Thus, an expected behavior defined by a behavior class can consider monitored behaviors of electrical devices of another behavior class.

The monitoring system can be used to detect commissioning errors during installation and/or during replacement. Also defective electrical devices can be detected.

Figure 5:
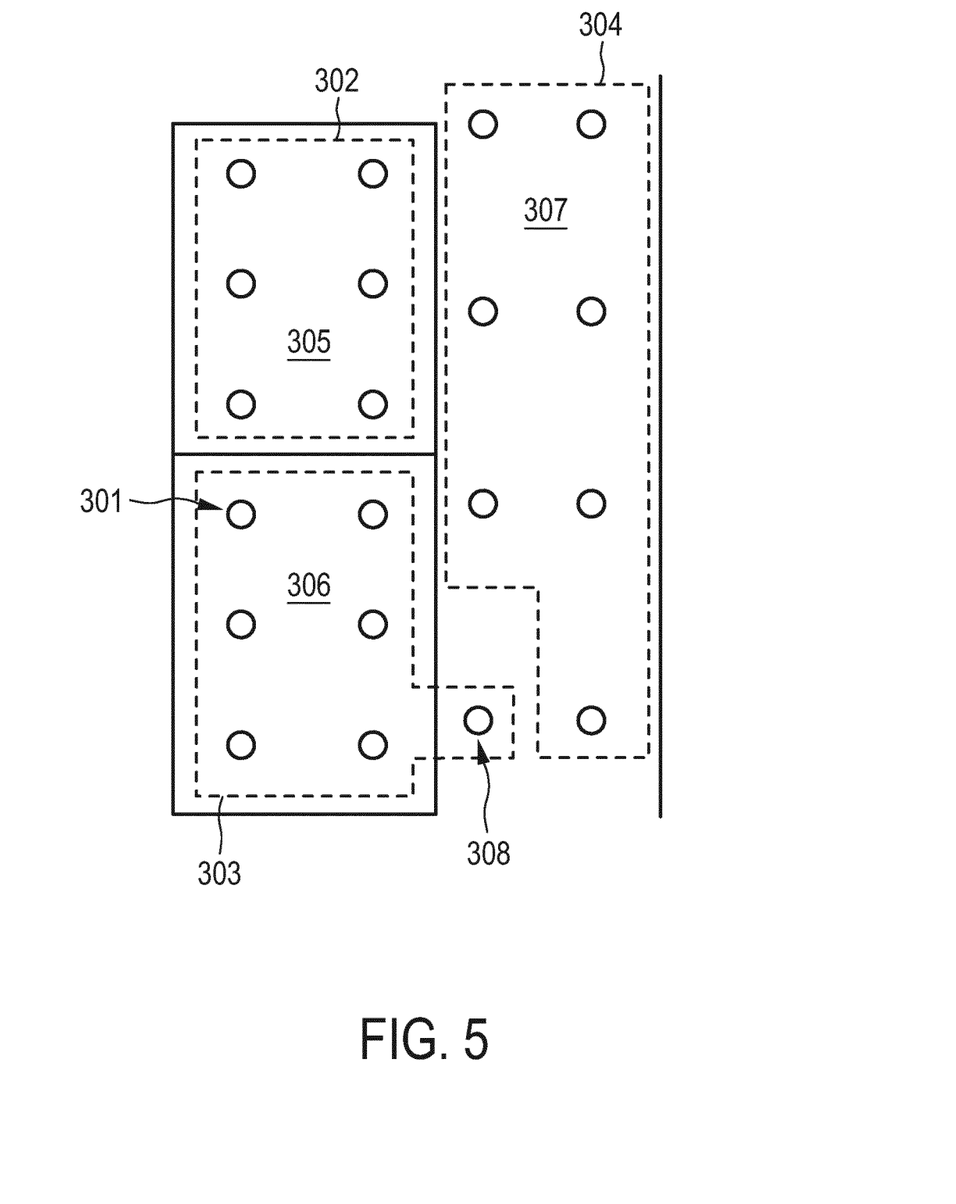
FIG. 5 illustrates schematically and exemplarily a commissioning error.

In an embodiment the monitoring system is adapted to determine a deviation of a monitored behavior of an electrical device of a first behavior class from a monitored behavior of another electrical device of another behavior class, in order to detect a commissioning error. In particular, FIG. 5 shows luminaires 301 with integrated presence sensors and light sources in a first room 305, a second room 306 and a corridor 307. The assignment of these luminaires 301 to behavior classes should be such that all luminaires 301 located in a same room or a same corridor should be assigned to the same behavior class. In FIG. 5 the behavior classes are indicated by the broken lines 302, 303, 304. Luminaires 301 within the first room 305 should be assigned to a first behavior class indicated by the broken line 302, luminaires 301 located within the second room 306 should be assigned to a second behavior class indicated by the broken line 303 and luminaires 301 within the corridor 307 should be assigned to a third behavior class indicated by the broken line 304. As can be seen in FIG. 5, the luminaire 308 has wrongly been assigned to the second behavior class, which should only include luminaires 301 located within the second room 306, because the luminaire 308 is located within the corridor 307.

Figure 6:
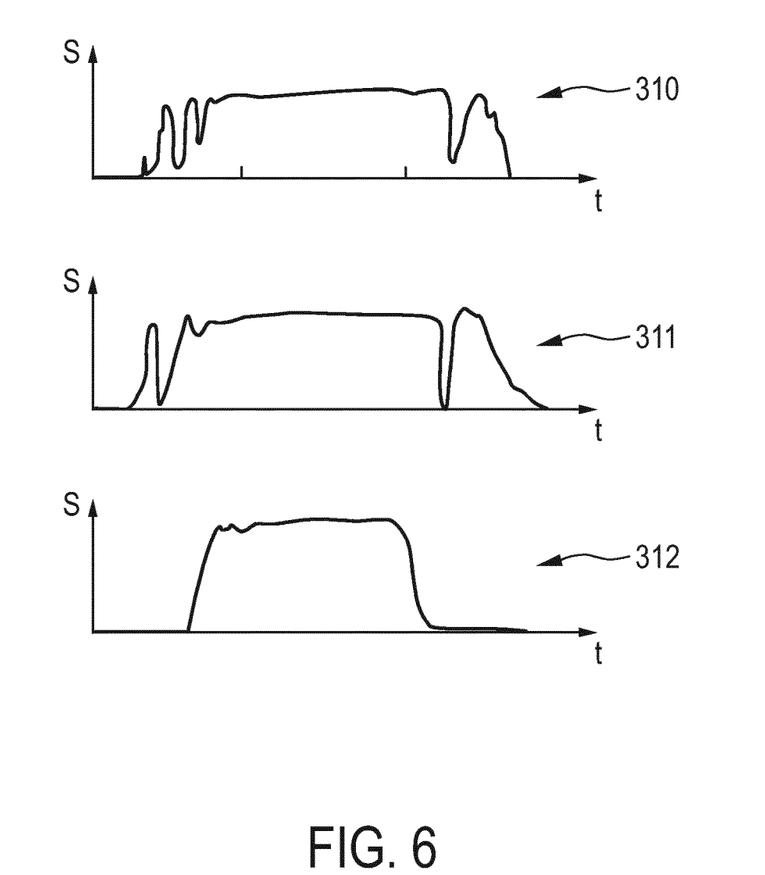
FIG. 6 shows schematically and exemplarily sensing signals provided by presence sensors assigned to behavior classes.

FIG. 6 schematically and exemplarily illustrates sensing signals S over time t, wherein reference number 310 indicates a sensing signal S for a luminaire in the corridor, reference number 311 indicates a sensing signal S for the luminaire 308 and reference number 312 indicates a sensing signal S for a luminaire within the second room 306. As can be seen in FIG. 6, the sensing signal 311 for the luminaire 308 is very similar to the sensing signal 310 for a luminaire located within the corridor and significantly differs from the sensing signal 312 provided by a luminaire within the second room 306. Thus, if the sensing signal 311 is correlated with the sensing signal 310, the resulting correlation value will be relatively large indicating a relatively small deviation, whereas, if the sensing signal 311 is correlated with the sensing signal 312, the correlation value will be relatively small indicting a relatively large deviation. By correlating the signal 311 with the signal 310 and/or with the signal 312 is can therefore be determined that the luminaire 308 has been assigned to the wrong behavior class. Moreover, based on the correlation between the sensing signals 310, 311 it can be determined that the luminaire 308 should be assigned to the third behavior class indicated by the broken line 304 such that not only the wrongly assigned luminaire 308 may be output by the output unit, but the output unit may also output a suggestion for a correct behavior class. It is also possible that the luminaire 308 is automatically assigned to the third behavior class based on the correlation between the sensing signal 311 of the luminaire 308 and the sensing signal 310 of a luminaire located within the corridor 307 and assigned to the third behavior class.

Thus, by verification of occupancy correlation of different rooms or corridors the monitoring system can determine that, for instance, the luminaire 308 shows too much correlation with the luminaires in the corridor 307, where it was expected to have more correlation with the luminaries located within the second room 306. If the first and second rooms 305, 306 are meeting rooms, it is likely that these meeting rooms 305, 306 will show occupancy from, for instance, 9:00 to 17:00, whereas the corridor 307 may show occupancy also earlier in the morning and later in the evening, for instance, at 7:00 and 19:00. Recurring deviations from these behaviors can be strong indicators of commissioning errors.

In an embodiment the monitoring system can be a distributed monitoring system, wherein the functionalities of the monitoring system are distributed among the electrical devices. In particular, the assignment providing unit can comprise assignment providing subunits, the monitoring unit can comprise monitoring subunits, the deviation determination unit can comprise deviation determination subunits and the output unit can comprise output subunits, wherein these subunits are integrated in the electrical devices. For instance, as schematically and exemplarily illustrated in FIG. 7, a light source L can comprise a light emitting element 411 like a light emitting diode, which is controlled by a controller 414. The controller 414 may comprise an assignment providing subunit 407 for providing an assignment between the electrical device L and a behavior class, wherein the behavior class defines an expected behavior of the electrical device L over time, a monitoring subunit 408 for monitoring the behavior of the electrical device L over time, and a deviation determination subunit 409 for determining a deviation a) between the monitored behavior of the electrical device L and the expected behavior defined by the behavior class and/or b) between the monitored behavior of the electrical device L and a monitored behavior of another electrical device, wherein the other electrical device may also comprise these subunits. The other electrical device might be, for instance, another light source or a sensor.

Figure 7:
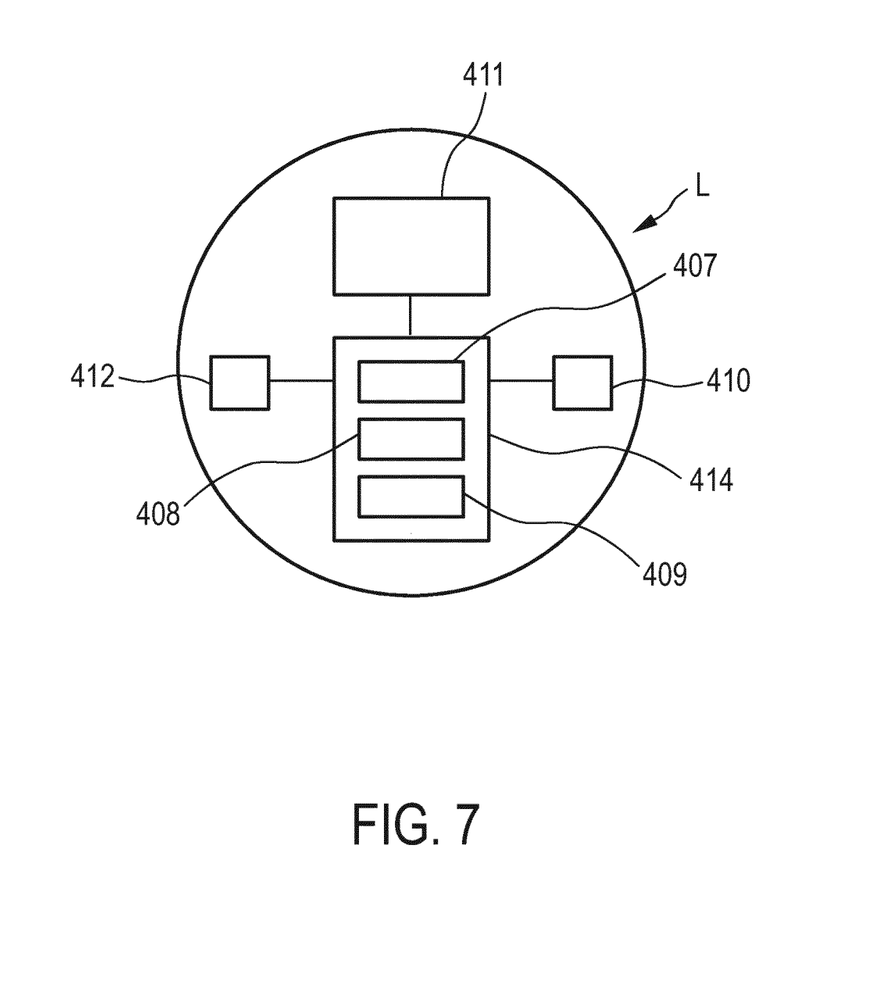
FIG. 7 shows schematically and exemplarily an embodiment of an electrical device comprising parts of a distributed monitoring system.

The light source L further comprises a communication unit 412 for communicating with other electrical devices, in order to, for instance, receive a sensor signal from a sensor or to receive information regarding the behavior of one or several other electrical devices. Moreover, the light source L comprises an output subunit 410 for providing an output depending on the deviation determined by the deviation determination subunit 409. In an embodiment the output subunit 410 and the light emitting element 411 are integrated, i.e. in an embodiment an additional output subunit is not needed, because the light emitting element 411 can act as the output subunit. For instance, if the determined deviation indicates a commissioning error of the light source L, the light emitting element 411 may indicate this by providing light having a certain color or, for instance, by providing blinking light.

The electrical device comprising the subunits can also comprise an input unit allowing a user like an installer to provide an input for indicating the behavior class of the electrical device, which can then be stored in the assignment providing subunit. This input unit may be a communication unit which is also used for communicating between different electrical devices. However, the input unit can also be an additional input unit dedicated for receiving inputs from a user.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or devices may fulfill the functions of several items recited in the claims. The mere fact that certain measures are recited in mutually different dependent claims does not indicate that a combination of these measures cannot be used to advantage.

Procedures like the monitoring of the behavior of the electrical devices, the determination of deviations between different behaviors, the assignment procedures for assigning electrical devices to behavior classes, et cetera performed by one or several units or devices can be performed by any other number of units or devices. These procedures and/or the control of the monitoring system in accordance with the monitoring method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a monitoring system for monitoring electrical devices like luminaires. An assignments providing unit provides assignments between the electrical devices and behavior classes defining expected behaviors, wherein a deviation determination unit determines a deviation a) between a monitored behavior of an electrical device assigned to a behavior class and an expected behavior defined by a behavior class and/or b) between a monitored behavior of an electrical device and a monitored behavior of another electrical device, wherein an output unit provides an output depending on the determined deviation. The deviation can be indicative of a commissioning error, i.e., for instance, of an assignment of an electrical device to a wrong room within a building. The monitoring system can therefore allow for an automatic detection of commissioning errors in a building which may have thousands of electrical devices.

The invention claimed is:

1. A monitoring system for monitoring one or more electrical devices to detect commissioning errors, wherein the monitoring system comprises one or more processors configured to:
   provide assignments between the one or more electrical devices and behavior classes, wherein a behavior class defines an expected behavior of a respective electrical device assigned to the behavior class, and wherein the expected behavior corresponds to expected occupancy over time of an area corresponding to the behavior class,
   monitor behavior of the one or more electrical devices over time, wherein the behavior of the one or more electrical devices is determined by monitoring signals generated over time by the one or more electrical devices after the one or more electrical devices have been commissioned and located,
   determine a deviation based on the monitored signals by using a similarity measure a) between the behavior of a first electrical device of the one or more electrical devices assigned to a behavior class and an expected behavior defined by a behavior class and/or b) between the behavior of the first electrical device and a monitored behavior of another electrical device of the one or more electrical devices,
   generate an output using the determined deviation and a location of the first electrical device, wherein the output is indicative of the first electrical device being erroneously commissioned relative to the location of the first electrical device, wherein the output indicates a difference in a sensing signal associated with the first electrical device at the location of the first electrical device and a sensing signal associated with the monitored behavior of the another electrical device of the one or more electrical devices, and wherein the sensing signal associated with the first electrical device is used to control operation of the first electrical device, and
   determine that the first electrical device is assigned to the behavior class that is different from a behavior class for the location of the first electrical device.

2. The monitoring system as defined in claim 1, wherein the one or more processors are adapted to determine a deviation of a monitored behavior of the first electrical device from an expected behavior defined by the behavior class assigned to the first electrical device.

3. The monitoring system as defined in claim 1, wherein the one or more processors are adapted to determine a deviation of a monitored behavior of the first electrical device assigned to a behavior class from an expected behavior defined by another behavior class.

4. The monitoring system as defined in claim 1, wherein the one or more processors are adapted to determine a deviation of a monitored behavior of the first electrical device assigned to a behavior class from a monitored behavior of the another electrical devices assigned to the same behavior class.

5. The monitoring system as defined in claim 1, wherein the one or more processors are adapted to determine a deviation of a monitored behavior of the first electrical device assigned to a behavior class from a monitored behavior of the another electrical device assigned to another behavior class.

6. The monitoring system as defined in claim 1, wherein the first electrical device is configured to control a second electrical device of the one or more electrical devices, wherein the one or more processors are adapted to provide an output depending on whether the first and second electrical devices are assigned to a same behavior class or to different behavior classes.

7. The monitoring system as defined in claim 1, wherein the one or more processors are adapted to determine deviations of a monitored behavior of the first electrical device from all expected behaviors defined by all behavior classes, wherein the one or more processors are adapted to indicate if all deviations are larger than a predefined deviation threshold.

8. The monitoring system as defined in claim 1, wherein the one or more processors are adapted to generate an assignment between the first electrical device and a behavior class based on a) the monitored behavior of the first electrical device and b) the expected behaviors defined by the behavior classes and/or the monitored behavior of the another electrical device assigned to a behavior class.

9. The monitoring system as defined in claim 1, wherein the one or more processors are adapted to provide the assignments such that the one or more electrical devices located in a same room or corridor are assigned to a same behavior class.

10. A system of electrical devices comprising the one or more electrical devices and a monitoring system as defined by claim 1.

11. The system as defined in claim 1, wherein the one or more processors are adapted to provide an assignment between the first electrical device and a behavior class, wherein the behavior class defines an expected behavior of the first electrical device over time,
wherein the one or more processors are further adapted to:
monitor the behavior of the first electrical device over time,
determine a deviation a) between the monitored behavior of the first electrical device and the expected behavior defined by the behavior class and/or b) between the monitored behavior of the first electrical device and a monitored behavior of the another electrical device, and
provide an output depending on the determined deviation.

12. A method for monitoring one or more electrical devices to detect commissioning errors, wherein the monitoring method comprises:
providing assignments between the one or more electrical devices and behavior classes, wherein a behavior class defines an expected behavior of a respective electrical device assigned to the behavior class, and wherein the expected behavior corresponds to expected occupancy over time of an area corresponding to the behavior class,
monitoring behavior of the one or more electrical devices over time, wherein the behavior of the one or more electrical devices is determined by monitoring signals generated over time by the one or more electrical devices after the one or more electrical devices have been commissioned and located,
determining a deviation based on the monitored signals by using a similarity measure a) between the behavior of a first electrical device the one or more electrical devices and an expected behavior defined by a behavior class and/or b) between the behavior of the first electrical device and a monitored behavior of another electrical device of the one or more electrical devices,
generating an output using the determined deviation and a location of the first electrical device wherein the output is indicative of the first electrical device being erroneously commissioned relative to the location of the first electrical device, wherein the output indicates a difference in a sensing signal associated with the first electrical device at the location of the first electrical device and a sensing signal associated with the monitored behavior of the another electrical device of the one or more electrical devices, and wherein the sensing signal associated with the first electrical device is used to control operation of the first electrical device, and
determining that the first electrical device is assigned to the behavior class that is different from a behavior class for the location of the first electrical device.

13. A computer program product comprising program code means, stored in a non-transitory computer readable medium, for carrying out the monitoring method as defined by claim 12.

14. The monitoring system as defined in claim 1, wherein the one or more processors are adapted to:
determine the deviation is greater than a first deviation threshold for a difference between the behavior of the first electrical device at the location of the first electrical device and an expected behavior of at least one electrical device positioned at the location of the first electrical device; and
determine the deviation is greater than a first deviation threshold for a difference between the behavior of the first electrical device at the location of the first electrical device and the monitored behavior of the another electrical device of the one or more electrical devices.

15. The monitoring system as defined in claim 1, wherein the output indicates a difference in the sensing signal associated with the first electrical device at the location of the first electrical device and a sensing signal associated with an expected behavior of at least one electrical device positioned at the location of the first electrical device.

16. The monitoring system as defined in claim 1, wherein the one or more processors are adapted to, based on the difference in the sensing signal and the determination that the first electrical device is assigned to the behavior class that is different from the behavior class for the location of the first electrical device, determine a second assignment indicating a second behavior class for the first electrical device, the second behavior class corresponding to the behavior class for the location of the first electrical device.

\* \* \* \* \*